May 23, 1972      W. J. KNIGHT      3,664,590

LAWN SPRINKLER WITH NOVEL PATTERN CONTROL MEANS

Filed June 12, 1970      2 Sheets-Sheet 1

WILLIAM J. KNIGHT
INVENTOR.

BY Norman L. Chalfin

AGENT.

May 23, 1972     W. J. KNIGHT     3,664,590
LAWN SPRINKLER WITH NOVEL PATTERN CONTROL MEANS
Filed June 12, 1970     2 Sheets-Sheet 2
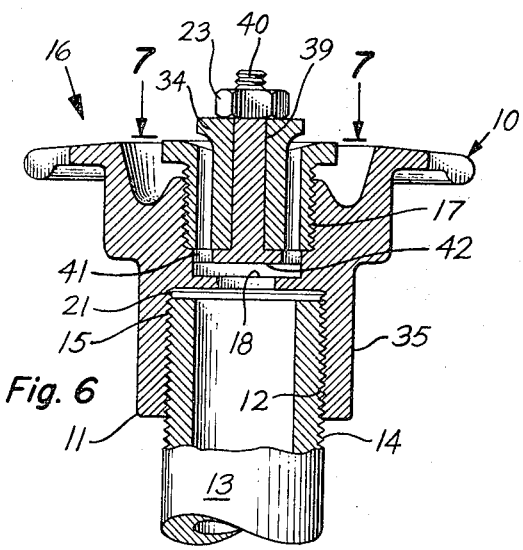
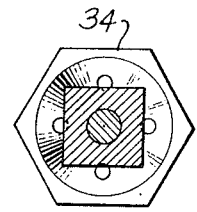
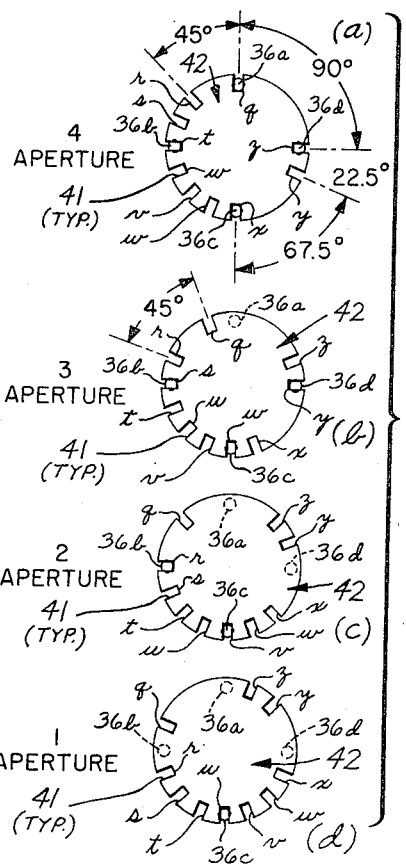
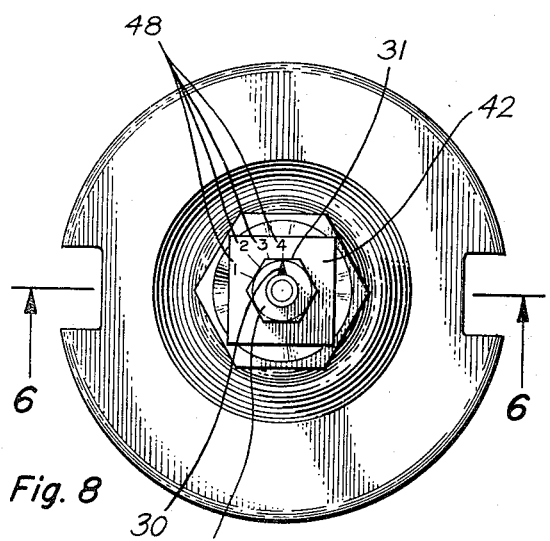
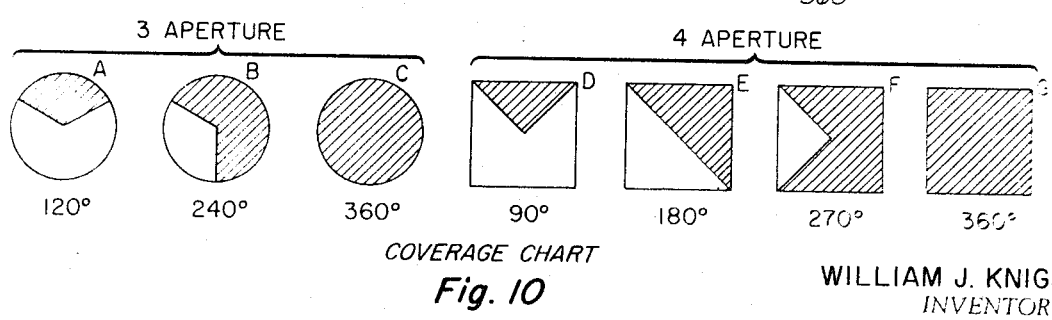
WILLIAM J. KNIGHT
INVENTOR.
BY *Norman L. Chupp*
AGENT.

United States Patent Office 3,664,590
Patented May 23, 1972

3,664,590
LAWN SPRINKLER WITH PATTERN CONTROL MEANS
William J. Knight, 1102 Fairview, Arcadia, Calif. 91006
Filed June 12, 1970, Ser. No. 45,700
Int. Cl. B05b 1/26
U.S. Cl. 239—499       3 Claims

ABSTRACT OF THE DISCLOSURE

A lawn sprinkling spout or head is disclosed which is adjustable to spray a variety of shapes of lawn sectors selectively with water. The position of the sector of the lawn is also selectable. The sprinkler head has a plurality of outlet apertures arranged in a uniform distribution. Over these apertures a movable mask is operably located. The mask has a plurality of notches or apertures arranged in a predetermined pattern so that particular combinations of the apertures of the mask may be positioned in the path of predetermined groups of the outlet apertures to permit communication between a water source and the predetermined pattern of outlets which are in position over the mask. The remaining outlets are blocked. As a result a selectable lawn spray pattern is achieved.

BACKGROUND OF THE INVENTION

In the prior art many lawn sprinkling spout arrangements or what may be called sprinkler heads have been shown for the purpose of sprinkling specific lawn shapes, or sectors of lawns. None of these prior art heads are fully adjustable for a selected proportionate sector of a rectangular or circular lawn.

These prior art sprinkler heads provide coverage of only one shape. For continuous coverage of an area many sprinkler heads are required. Each head provides some particular spray pattern characteristics. The sprays from each, in effect, lap over one another.

THE PRESENT INVENTION

This invention contemplates a variable area lawn sprinkler head which, when used on a circular lawn, may be adjusted to cover any pie-shaped sectors of the lawn or a plurality of sectors up to the complete circle. Alternatively, the head may be adjusted to cover a rectangular or triangular shaped lawn on toto, or in any selected uniform sector thereof.

A principal feature of the invention is in the simplicity of the adjustment means, this involves slotted or apertured discs or masks arranged so that 1, 2, 3, or more slots, or apertures of the masks may be positioned over outlet portions of a spout array. The spout array is of a predetermined shape and configuration so that the desired sector of the lawn of particular shape may be watered. For example, a three-outletted sprinkler head, according to the invention, can be adapted by the use and positioning of its cooperating slotted or apertured disc or mask to cover an area having an angle of 120°, 240° or the full 360° from, or about, the sprinkler head as a center of rotation. In another embodiment a four-outletted sprinkler head according to the invention can be adapted with the use of its cooperating slotted or apertured disc or mask to cover 90°, 180°, 270° or the full circle as selected.

The desired angle of coverage is selected by the more positioning of a knurled nut or screws on the head which may be part of the apertured disc abovementioned. This can be accomplished with a coin such as a dime, if a screw driver is unavailable. The devices of this invention may be attached to existing sprinkler piping and heads.

For more sectors having units of smaller angles divisible evenly into 360 degrees the same principles of construction of the sprinkler according to the invention may be applied as will be clear to those skilled in the art applicable to this invention, who in the light of the teachings herein will be able to devise similar heads for lawn sprinklers for any arrangement of lawn shape or sector thereof to be encountered in practice within the ambit of the claimed invention. It should therefore be clearly understood that in the specification which follows and in the drawings the embodiments shown and described are merely illustrative of the principles upon which the invention is based, and should not be construed as limiting the invention thereto.

IN THE DRAWINGS

FIG. 6 is a cross sectional view of a four apertured head according to the invention to give rectangular coverage in 90° sector increments of an area to be watered;

FIG. 7 is a partially cross-sectional view through 7—7 of FIG. 6 showing aperture locations of a four aperture lawn sprinkler head according to the invention;

FIG. 8 is a top plan view of the head shown in FIG. 6;

Figure 2:
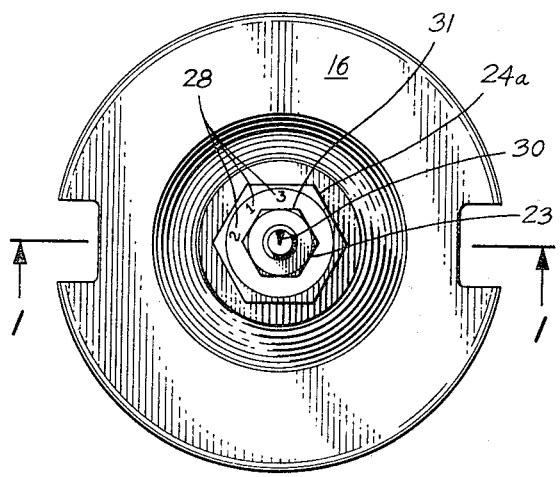
FIG. 2 is a top plan view of the head shown in FIG. 1.

FIG. 9 is a series of descriptive schematic drawings illustrative of the positions of the slots on the masks viewed from below for use on a four apertured head according to the invention showing the several positions thereof with respect to the outlet apertures of the sprinkler head for 90°, 180°, 270° and 360° sector coverage therewith in sprinkling a lawn; and FIG. 10 shows a series of coverage charts for the three and four apertured adjustable lawn sprinklers according to this invention as shown in FIGS. 2 and 8 respectively.

Figure 1:
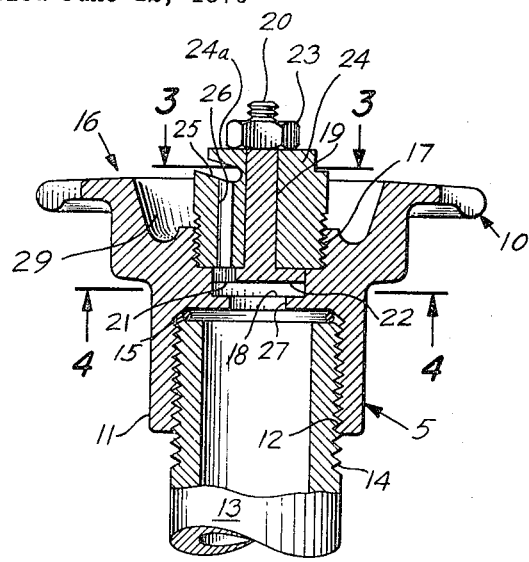
FIG. 1 is a cross-sectional view of a three-aperture lawn spray head according to this invention cutting through 1—1 of FIG. 2, and through one of the apertures thereof.
Figure 3:
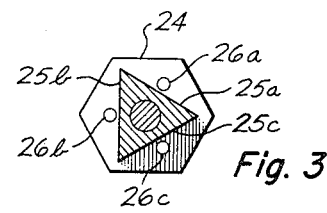
FIG. 3 is a partially cross-sectional top view through 3—3 of FIG. 1 showing a part of the invention including the locations of the three apertures in the three-apertured head with masks removed.

Referring now to FIG. 1 in particular and the FIGS. 2-5 generally, the sprinkler head 5 according to this invention can be seen to include an assembly cap 10 of generally circular configuration resembling somewhat an umbrella or mushroom top in appearance. The stem 11 of cap 10 has a central internally-threaded bore 12 for screwing the head 5 onto a water source pipe 13 part of a lawn sprinkling system. Pipe 13 has external threads 14 to match internal threads 12 of stem 11. An O-ring 15 or other similar fluid sealing device such as a washer may be included in bore 12 as is commonly practiced in the plumbing arts.

In the top 16 of cap 10 central threaded bore 17 is provided to receive a threaded cylinder 24 with a hexagonal head 24a. Cylinder 24 has 3 bores 26a, 26b, 26c, further described below. The bottom 18 of bore 17 is undercut on a diameter slightly smaller than bore 17 to provide a receptacle and seat for perforated mask element 19 which has a shaft 20 externally threaded at the top portion thereof for a nut 23, and a disk-line base 22 larger in diameter than shaft 20. Base 22 has a series of six rectangular slots, apertures or perforations 21 positioned on the periphery thereof in a predetermined pattern as further shown in FIGS. 4 and 5 and further described below.

Threaded into bore 17 is a hexagon headed screw 24 which has three bores 26a, 26b and 26c drilled into it on 120° loci to a saw-cuts 25 into the side of screw 24. Each of the bores 26a, 26b and 26c into the saw-cuts 25 provide a water flow path through screw 24 when any particular one or group of bores 26a, 26b and 26c or all of them are positioned over one of or several of the rectangular apertures 21 in mask element 19. A hole 27 in the bottom of an undercut 18 provides a communicating path from water supply pipe 13 to the spray head elements 19 and 24 so that when hexagonal screw 24 is rotated to one of three positions (2,1,3) as shown in FIG. 2, two or three of the bores 26 will be over one, two or three of the six rectangular slots or apertures positioned in base 22 of mask element 19 so as to provide spray patterns A, B, C, as shown in FIG. 10 for the three aperture spray head, giving 120°, 240° or 360° coverage of a lawn or other area to be watered.

Figure 4:
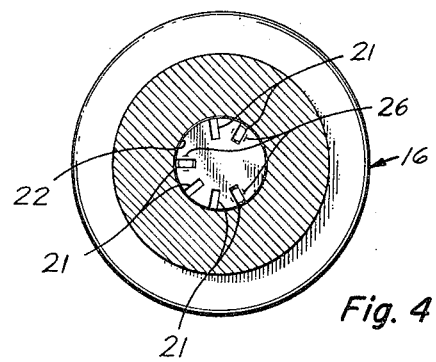
FIG. 4 is a cross section through 4—4 of FIG. 1 showing a top portion of the head viewed from below with the selective mask in place and open to all three apertures.
Figure 5:
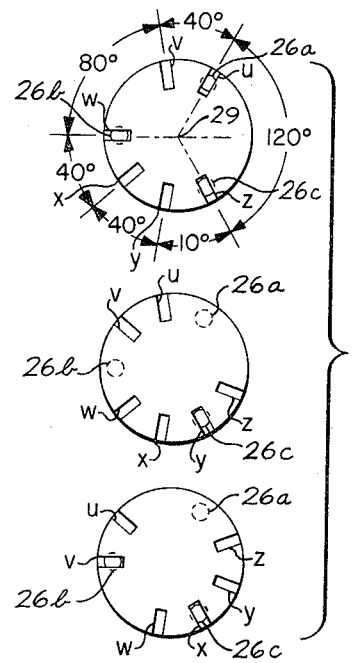
FIG. 5 is a group of schematic illustrations of the mask configurations for a three apertured head according to this invention as viewed from below showing the several positions of the mask for 360°, 240° or 120° lawn sector coverage, respectively.

Referring now to FIG. 5, the rectangular apertures identified as 21 in FIGS. 2 and 4 are identified further in FIG. 5 as u, v, w, x, y and z. Apertures u and v are 40° apart. Apertures v and w are 80° apart. Apertures w, x, y, and z are each 40° apart from one another and apertures u and z are 120° apart. Apertures u, w, and z, are respectively 120° apart on base 22 so that as may be seen at (a) in FIG. 5, which is a bottom view thereof, when base 22 of mask 19 is positioned as illustrated at (a) in FIG. 5 (viewed from below) aperture w is on a horizontal line as indicated by dashed line 29 through the center of base 22, then slot apertures u, w, and z are in communication with all three bores 26a, 26b, 26c and water flows through all three to provide a full circle lawn sprinkling spray coverage as shown at (c) in FIG. 10.

When the position of mask element 19 is changed by rotating it with nut 23 (FIGS. 1 and 2) so that indicator arrow 30 (FIG. 2) is pointing to flat 31 of nut 23, located so as to place flat 31 opposite number "3"—one of those identified at 28, the positioning of base 22 with respect to holes u, w and z over bores 26a, 26b and 26c respectively as described above, is accomplished.

It should be recalled here that the view of nut 23 in FIG. 2 is opposite to the view of mask bore 22 shown in FIG. 5 so that rotation of nut 23 counterclockwise as shown in FIG. 2 produces a clockwise rotation of mask base 22 as shown in FIGS. 4 and 5.

Other numbers "1" and "2" identified on nut 28 are arranged so that the position of flat 31 thereunder will provide one or two sector coverage and at "3" three sector coverage (each sector being 120°). In these positions base 22 will be positioned under bores 26a, 26b and 26c in cylinder 24 so that only one or two of slots 21 and bores 26a, 26b or 26c will be in communication.

When nut 23 is rotated counterclockwise 40° so that flat 31 and pointer 30 are facing numeral 1 on the head of screw 24 shown at 28 (FIG. 2) then as may be seen at B in FIG. 5 rectangular aperture y is aligned with bore 26c and bores 26a and 26b are both beneath unperforated portions of base 22 and so not in communication with pipe 13 through aperture 27. Water therefore only flows through one aperture in a 120° sector.

Referring now to FIG. 6 in particular and the FIGS. 7–9 generally, the four part sprinkler head 35 according to this invention can be seen to include an assembly cap 10 of generally circular configuration resembling somewhat an umbrella or mushroom top in appearance. The stem 11 of cap 10 has a central interally threaded bore 12 for screwing the head 35 onto a water source pipe 13 part of a lawn sprinkling system. Pipe 13 has external threads 14 to match internal threads 12 of stem 11. An O-ring 15 or other similar fluid sealing device such as a washer may be included in bore 12 as is commonly practiced in the plumbing arts.

In the top 16 of cap 10 a central threaded bore 17 is provided to receive a threaded cylinder 34 with a hexagonal head 34a. Cylinder 34 has four bores 36a, 36b, 36c, and 36d further described below. The bottom 18 of bore 17 is undercut on a diameter slightly smaller than bore 17 to provide a receptacle and seat for perforated mask element 39 which has a shaft 20 externally threaded at the top portion thereof for a nut 23, and a disk-like base 42 larger in diameter than shaft 40. Base 42 has a series of ten rectangular slots, apertures or perforations 41 positioned on the periphery thereof in a predetermined pattern as further shown in FIG. 9 and further described below.

Threaded into bore 17 is a hexagonally headed screw 34 which has four bores 36a, 36b, 36c and 36d into the saw-cuts 45 provide a water flow path through screw 34 when any particular one or group of bores 36a, 36b, 36c and 36d, or all of them, are positioned over one of, or several of, the rectangular apertures 41 in mask element 39. A hole 27 in the bottom of an undercut 18 provides a communicating path from water supply pipe 13 to the spray head elements 39 and 34 so that when hexagonal screw 34 is rotated to one of four positions (1, 2, 3, or 4) as shown at 48 in FIG. 8, one, two, three or four of the bores 30 (a–d) will be over one, two, three or four of the ten rectangular slots or apertures positioned in base 32 of mask element 39 so as to provide spray patterns D, E, F and G as shown in FIG. 10 for the three aperture spray head, giving 90°, 180°, 270° coverage of a lawn or other area to be watered.

Referring now to FIG. 9, the rectangular apertures identified as 41 are identified further in FIG. 9 as q, r, s, t, u, v, w, x, y and z. Apertures q and r are 45° apart. Apertures q and z are 40° apart. Apertures y and z are 22½° apart from one another and apertures x and y are 67½° apart. Apertures r through x are respectively 22½° apart on base 42 so that as may be seen at (a) in FIG. 9, which is a bottom view thereof, when base 42 of mask 39 is positioned as illustrated at (a) in FIG. 9 (viewed from below) apertures q and x are on a vertical line as indicated by dashed line 49 through the center of base 42, the slot apertures q, t, x and z are in communication with all four bores 36a, 36b, 36c, and 36d, and water flows through all four to provide a full rectangle lawn sprinkling spray coverage as shown at 9 in FIG. 10.

When the position of mask element 39 is changed by rotating it with nut 23, FIG. 6, so that indicator arrow 50 (FIG. 6) is pointing to flat 31 of nut 23, located so as to place flat 31 opposite number "4" (one of those identified on plate 48) the positioning of base 42 with respect to holes q through z over bores 36a, 36b, 36c and 36d respectively, as described above, is accomplished.

It should be recalled here that the view of nut 23 in FIG. 6 is opposite to the view of mask bore 42 shown in FIG. 9 so that rotation of nut 23 counterclockwise as shown in FIG. 6 produces a clockwise rotation of mask base 42 as shown in FIG. 9.

Other numbers "1" and "2" identified on plate 48 are arranged so that the position of flat 31 thereunder will provide one or two sector coverage; at "3", three sector coverage; and at "4," four sector coverage (each sector being 90°). In these positions base 42 will be positioned under bores 36a, 36b, 36c and 36d in cylinder 34 so that only one, two or three of slots 41 and bores 36a, 36b, 36c or 36d will be in communication.

When nut 23 is rotated counterclockwise 22½° so that flat 31 and pointer 30 are facing numeral 1 on the rectangular head of screw 34 shown at 48 (FIG. 8) then as may be seen at (d) in FIG. 9 rectangular aperture w is aligned with bore 36c and bores 36a, 36b and 36d are all beneath unperforated portions of base 42 and so not in communication with pope 13 through aperture 27.

Water therefore only flows through one aperture in a 90° sector.

There has been described hereinabove, two representative forms of a selective sector pattern sprinkler system, one producing 120° sectors, the other 90° sectors as a result of moving a mask 22 or 42 over apertures such as 36 or 26 in a water flow path so as to block off or permit water to flow from the apertures in sectors as illustrated in FIG. 10, A, B, C for the 120° sector system, or D, E, F, G for the 90° sector system.

What is claimed is:

1. In a lawn sprinkler for providing a pattern spray; an indexing mechanism,
   a rotatable circular plate having 10 notches separated in a predetermined pattern about the circular periphery thereof and mounted on said indexing mechanism with rotation steps of 22½°; said rotatable plate being disposed on a water outlet pipe;
   a fixed plate having four apertures therein on the same peripheral diameter as said ten notches in said rotatable plate, said four apertures being disposed 90° apart from one another;
   said rotatable plate and said fixed plate being of the same diameter and having a common axis so that as said rotatable plate is moved by said indexing mechanism beneath said fixed plate, particular ones of said ten notches fall into alignment with particular ones of said four apertures to permit water flow through said aligned apertures from said source; and
   a rectangular baffle guide plate disposed over said apertures in said fixed plate bisecting said apertures;
   whereby a spray of selected 90° triangular sectors of a rectangular configuration are additively accumulated in each 22½° step to provide lawn sprinkling coverage over said sectors.

2. In a lawn sprinkler for providing a pattern spray: an indexing mechanism;
   a rotatable circular plate having notches separated in a predetermined pattern about the circular periphery thereof and mounted on said indexing mechanism for rotation therewith in predetermined angular steps, said rotatable plate being disposed on a water outlet pipe;
   a fixed plate having apertures disposed uniformly apart from one another, said fixed plate and said rotatable plate having a common axis so that as said rotatable plate is moved by said indexing mechanism beneath said fixed plate, particular ones of said notches fall into alinement with particular ones of said apertures to permit water flow through said alined apertures from said source; and
   a polygonal baffle guide plate, the sides of said polygonal plate being equal in number to the number of said apertures in said fixed plate, said baffle plate being positioned over said apertures in said fixed plate to guide the water flow through said alined apertures and notches in sector patterns which are accumulated additively for each indexing step to provide lawn sprinkling coverage over said sectors.

3. In a lawn sprinkler for providing a pattern spray: an indexing mechanism;
   a rotatable circular plate having six notches separated in a predetermined pattern about the circular periphery thereof and mounted on said indexing mechanism with rotation steps of 40°, said rotatable plate being disposed on a water outlet pipe;
   a fixed plate having three apertures therein disposed 120° apart from one another, said fixed plate and said rotatable plate being of the same diameter and having a common axis so that said rotatable plate being moved beneath said fixed plate by said indexing mechanism provides alinement of particular ones of said three apertures with particular ones of said six notches to permit water flow through said alined apertures from said source; and
   a triangular baffle and guide plate disposed over said three apertures in said fixed plate to guide the water flow through respective alined apertures in 120° sector patterns, said sector patterns being additively accumulated in each 40° step to provide lawn sprinkling coverage over said sectors.

References Cited
UNITED STATES PATENTS

| | | | |
|---|---|---|---|
| 2,634,163 | 4/1953 | Double | 239—Pattern Dig. |
| 2,190,639 | 2/1940 | Wittek | 239—390 |

M. HENSON WOOD, Jr., Primary Examiner

M. Y. MAR, Assistant Examiner

U.S. Cl. X.R.

239—DIG 1, 524